March 31, 1970 H. N. ANDREWS 3,503,268
CONTROL ROD INSERTION SYSTEM
Filed Jan. 12, 1967 2 Sheets-Sheet 1

March 31, 1970 H. N. ANDREWS 3,503,268
CONTROL ROD INSERTION SYSTEM
Filed Jan. 12, 1967 2 Sheets-Sheet 2

WITNESSES
Theodore F. Wrobel
James T. Young

INVENTOR
Harry N. Andrews
BY
ATTORNEY

United States Patent Office 3,503,268
Patented Mar. 31, 1970

3,503,268
CONTROL ROD INSERTION SYSTEM
Harry N. Andrews, Monroeville, Pitcairn, Pa., assignor to Westinghouse Electric Corporation, Pittsburgh, Pa., a corporation of Pennsylvania
Filed Jan. 12, 1967, Ser. No. 608,854
Int. Cl. G21c 7/10
U.S. Cl. 74—2                                8 Claims

ABSTRACT OF THE DISCLOSURE

A plurality of coil springs are so disposed in spring holders that they function in series to drive a reactor control rod from its fully withdrawn to its fully inserted position in the reactor core irrespective of the axial position of the core. The springs have successively smaller diameters so that one can nest inside another in the compressed position. The spring holders are in telescoping relation with one functioning as a guide for the other and the coil springs being separated from each other by the walls of the spring holders.

---

This invention relates to heterogeneous nuclear reactors having control rods and, more particularly, to an arrangement for providing a positive insertion force on the control rod at all times.

In certain maritime nuclear reactor applications a scram spring system is required to provide positive insertion forces on the reactor control rod when the ship is inclined at large angles or capsized and there is a failure of control power for operating the rod drive mechanism which normally inserts the control rod. Also, certain mechanisms rely upon gravity to obtain rod insertion and an additional force must be supplied when the reactor is inclined beyond a certain angle.

An object of this invention is to provide a positive insertion means for a nuclear reactor control rod.

Another object of the invention is to provide a series-multiple spring system which requires a relatively small amount of space inside a reactor vessel and which functions regardless of the position of the reactor core.

Still another object of the invention is to provide a spring system capable of consistently producing a large force over a large range of travel.

A further object of the invention is to provide a spring system having a short solid or compressed height relative to the extended height of the system.

Other objects of the invention will be explained fully hereinafter or will be apparent to those skilled in the art.

In accordance with one embodiment of the invention, a spring pack comprising a plurality of concentric coil spring members and integrated spring holder and guide sleeve assemblies is mounted inside a cylindrical guide tube for a reactor control rod. The spring members have successively smaller diameters so that one can nest inside another in the compressed position. The spring holders are in telescoping relation with one functioning as a guide for the other and the coil springs being separated from each other by the walls of the spring holders. The springs are so disposed in the holders that they function in series to drive the control rod from its fully withdrawn to its fully inserted position in the reactor core irrespective of the axial position of the reactor core.

For a better understanding of the nature and objects of the invention, reference may be had to the following detailed description, taken in conjunction with the accompanying drawings, in which.

Figure 1:
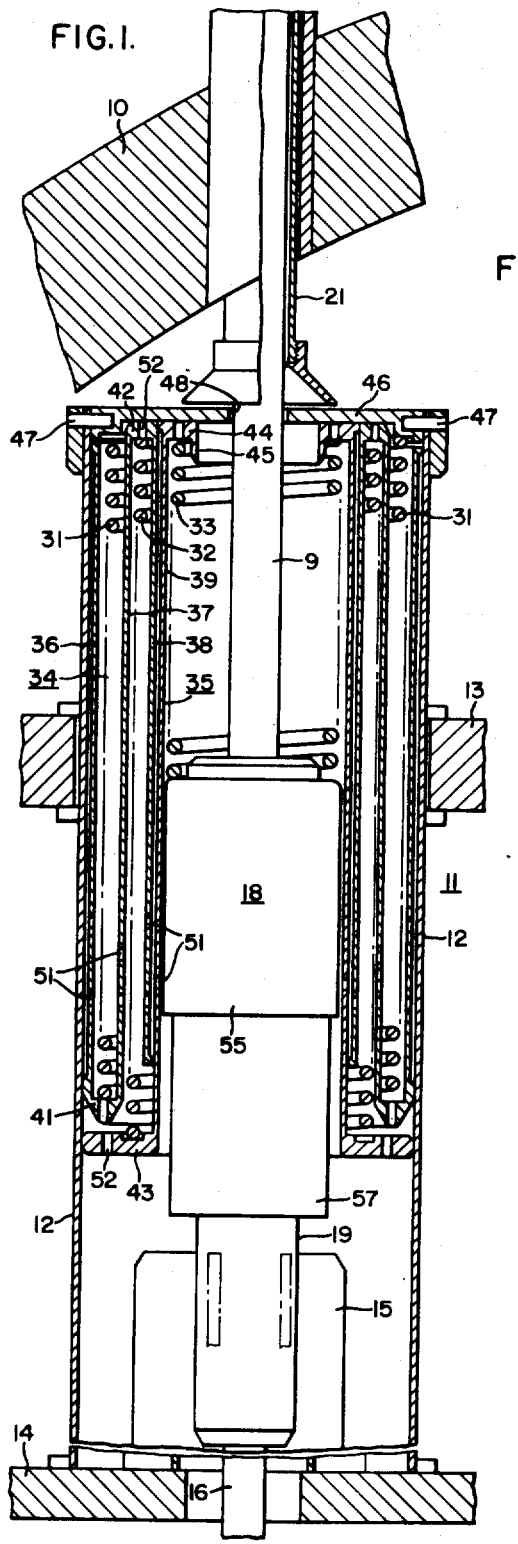
FIGURE 1 is a view, in longitudinal section, of a spring system constructed in accordance with the invention, the spring members being in the compressed position.
Figure 2:
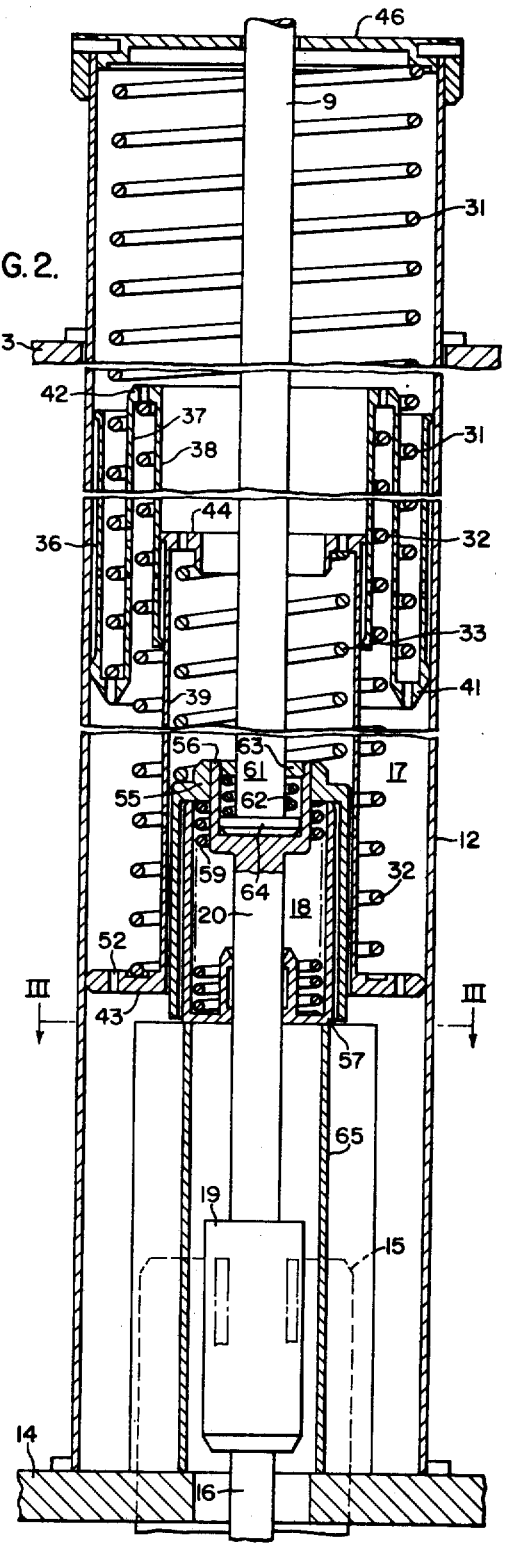
FIG. 2 is a view, similar to FIG. 1, the spring members being in the extended position.

Referring to the drawing, and particularly to FIG. 1, the structure shown therein comprises a portion of a reactor pressure vessel 10 containing a reactor core (not shown), a control rod drive shaft assembly 11 disposed within vessel 10, a cylindrical guide tube 12 which is supported at its upper end by a guide tube support plate 13 and at its lower end by an upper core support plate 14, (see FIG. 2), guide members 15 for slidably guiding movement of a control rod 16 inside the guide tube 12, a spring pack assembly 17, a dashpot assembly 18 and a control rod coupling member 19. A portion 9 of the drive shaft extends through the top of the vessel 10 inside a thermal sleeve assembly 21. A control rod transition member 20 is disposed between the coupling 19 and the drive shaft 9 as shown in FIG. 2.

Normally, the drive shaft assembly 11 is raised and lowered by means of an electrically operated drive mechanism (not shown) which cooperates with the drive shaft 9 and which may be of the type fully described in Patent 3,158,766, issued Nov. 24, 1964 to E. Frisch and assigned to the Westinghouse Electric Corporation. In the event of failure of the power source for operating the drive mechanism, energy for scram of the control rod downwardly is provided both by the stored energy in the spring pack 17 and gravity up to a certain angle of ship roll depending upon mechanical friction and flow conditions. Beyond this angle, the energy for scram is provided only by the spring pack 17.

In FIG. 1 the drive shaft assembly 11 is shown in its fully withdrawn or uppermost position so that the control rod 16 is substantially completely withdrawn from the reactor core. In this position of the control rod, the spring pack 17 is fully compressed. In FIG. 2 the drive shaft assembly 11 is shown in its fully inserted or lowermost position with the central rod being substantially completely inserted into the reactor core with the spring pack 17 being fully extended.

As shown, the spring pack 17 comprises a plurality of concentric coil springs 31, 32 and 33 which have successively smaller diameters to permit them to be nested when they are compressed. The springs are retained in position and separated from each other by combined spring holder and guide sleeve assemblies 34 and 35 disposed in telescoping relation. The assemblies 34 and 35 are of an integrated construction. The outer assembly 34 includes sleeves 36, 37 and 38 and the inner holder 35 includes a sleeve 39. The lower ends of the sleeves 36 and 37 are joined by a ring 41. The upper ends of the sleeves 37 and 38 are joined by a ring 42. The lower end of the sleeve 39 is attached to a ring 43 and the upper end is attached to a ring 44 having a downwardly extending circumferential projection 45 thereon. When the spring jack is compressed, the rings 42 and 44 engage an end cap 46 which is retained in the upper end of the guide tube 12 by pins 47. The cap 46 has a central opening 48 therein through which the drive shaft 9 extends.

The outer spring holder 34 guides on the inside surface of the guide tube 12 with the inner surface of sleeve 38 of holder assembly 34 serving as one guide for the inner spring holder 35. The upper end of the inner spring holder 35 guides on the sleeve 38 of the outer spring holder 34 and the integral ring member 43 on the lower end guides on the inside surface of the guide tube 12. Guide surfaces on the sleeves of the spring holders protrude from the sleeve walls to minimize mechanical friction and hydraulic drag. To minimize hydraulic drag of the spring pack, the guide sleeves are perforated as at 51 and flow holes 52 are provided in the guide sleeve and spring support rings 41, 42, 43 and 44. These rings are so constructed that flow is permitted to pass through the rings and around the spring end coils.

As shown more clearly in FIG. 2, the dashpot assembly 18 comprises an internally flanged cylindrical sleeve 55, which is secured to an enlarged cup-shaped end 56 on the control rod transistion member 20, and a sleeve 57 which telescopes into the sleeve 55 and has a re-entrant portion 58 slidably engaging the transition member 20. Thus, the sleeve 57 functions as a piston inside the cylinder 55. A spring 59 disposed inside the sleeves 55 and 57 is compressed when the sleeve 57 telescopes into the sleeve 55. The dashpot functions as a hydraulic shock absorber to absorb the kinetic energy of the system during the final portion of control rod travel. The spring 59 assures resetting of the dashpot piston 57.

An impact spring assembly 61 is disposed inside the cup-shaped portion 56 of the control rod transition member 20. The assembly 61 includes a spring 62 disposed between a retaining ring 63 and an enlarged portion 64 on the end of the drive shaft 9. The ring 63 may be threaded into the portion 56 of the member 20. The assembly 61 reduces the impact loadings between the control rod and the drive shaft.

Assuming that the drive shaft 9 is released by the driving mechanism when the spring pack 17 is fully, or partly, compressed, the outer spring 31 reacts with the guide tube end cap 46 and the outer spring holder 34 at the end ring 41 to drive the outer spring holder away from cap 46. The intermediate spring 32 reacts with the outer spring holder end ring 42 and the inner spring holder end ring 43 to drive the inner spring holder 35 away from cap 46. The inner spring 33 reacts with the end ring 44 and the dashpot sleeve 55 to drive the dashpot assembly 18 in a direction to insert rod 16 into the reactor core. When the drive shaft nears the end of its downward travel the dashpot sleeve 57 engages a dashpot stop 65 to force the sleeve 57 into the cylinder 55 and compress the spring 59 inside the dashpot.

Figure 3:
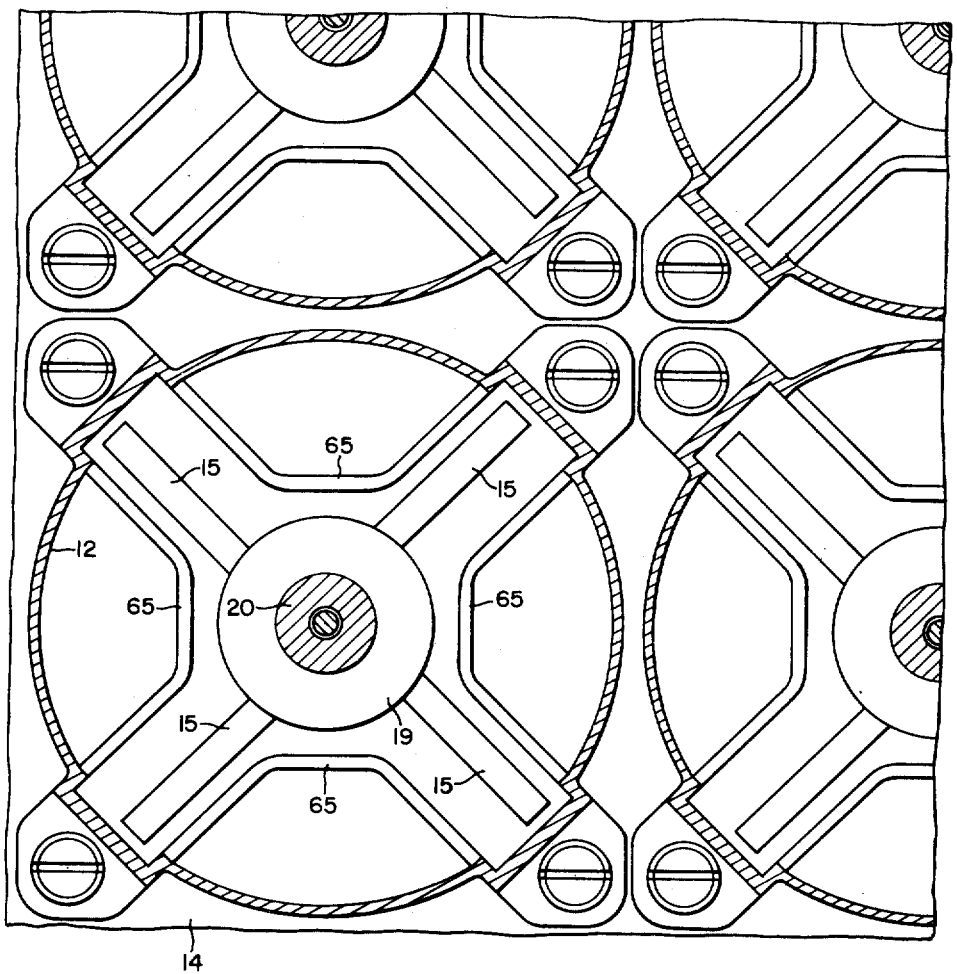
FIG. 3 is a view in transverse section, taken along the line III—III in FIG. 2.

As shown more clearly in FIG. 3, the dashpot stop 65 is disposed inside the guide tube 12 and is so constructed that the guide members 15 and the control rod coupling member 19 can pass through the stop to permit the control rod 16 to move to the position shown in FIG. 2. Thus, the spring pack 17 drives the control rod to its fully inserted position regardless of the position of the ship which may even be capsized. The springs of the spring pack function in series to provide the force necessary to drive the control rod.

The solid or compressed height of the spring pack is greatly reduced by nesting the springs of the pack. Furthermore, the diameter of the spring pack is relatively small, thereby permitting it to be installed in an existing reactor without increasing the overall size of the reactor. Since the springs are separated from each other by the walls of the guide sleeves, jamming of the springs during operation is prevented. The reaction distance of the spring assemblage is equal at least to the rod travel between the fully inserted and fully withdrawn positions of the control rod. The series operation of the springs permits substantially the same initial and final load. Shock is absorbed by the dashpot stop means and not by the fixed stop means 65 and not by the reactor control rod. The scram spring system herein described is relatively simple in construction and it may be economically manufactured and installed.

Since numerous changes may be made in the above-described construction and different embodiments of the invention may be made without departing from the spirit and scope thereof, it is intended that all subject matter contained in the foregoing description or shown in the accompanying drawings shall be interpreted as illustrative and not in a limiting sense.

What is claimed is:

1. A spring system for driving a nuclear reactor control rod from its fully withdrawn to its fully inserted position comprising a cylindrical guide tube, a control rod drive shaft movable axially inside the tube, a plurality of concentric springs surrounding the drive shaft, said springs having successively smaller diameters, combined spring holder and guide sleeve assemblies disposed in telescoping relation to separate the springs, and said springs reacting with the holders to function in series to drive the control rod toward its inserted position within the reactor core.

2. The spring system defined in claim 1 wherein one spring holder and guide sleeve forms the guide means for the adjacent holder and sleeves.

3. The spring system defined in claim 2 wherein at least said one and said adjacent holder and sleeves include cooperating stop means for limiting telescoping movement of said adjacent holder and sleeve relative to said one holder and sleeve.

4. The spring system defined in claim 1 wherein the spring holder and guide sleeve assemblies include concentric sleeves joined at their ends by rings having holes therethrough.

5. The spring system defined in claim 4 wherein the concentric sleeves have holes in their walls.

6. The spring system defined in claim 1 including a dashpot assembly at one end of the drive shaft.

7. The spring system defined in claim 6 including stop means for compressing the dashpot when the control rod is fully inserted into the reactor.

8. The spring system of claim 1 wherein the reaction distance of the spring system is equal at least to the rod travel between fully inserted and fully withdrawn positions.

References Cited

UNITED STATES PATENTS

| 2,685,803 | 8/1954 | Weber et al. | 74—503 |
| 3,043,762 | 7/1962 | Martin et al. | 176—36 |

MILTON KAUFMAN, Primary Examiner

U.S. Cl. X.R.

176—36; 185—37; 267—1